United States Patent Office 2,964,504
Patented Dec. 13, 1960

2,964,504

STEAM CRACKING OF LIGHT NAPHTHA AND PREPARATION OF RESINS

Robert F. Leary, Cranford, Howard T. Oakley, Elizabeth, and John F. McKay, Cranford, N.J., assignors to Esso Research and Engineering Company, a corporation of Delaware No Drawing. Filed Dec. 10, 1956, Ser. No. 627,090

5 Claims. (Cl. 260—82)

This invention relates to steam cracking of light naphtha. More particularly it relates to an improvement in the preparation of hydrocarbon resins from steam cracked light naphtha.

Steam cracking of various petroleum hydrocarbon fractions such as gas oil or heavy naphtha is a well-known process that is assuming ever increasing importance as a source of ethylene, butadiene, etc. In addition to producing the desired light olefins and diolefins, conventional steam cracking of the heavier petroleum fractions also produces a valuable intermediate fraction boiling between about 60° and 250° F. and containing $C_5$ and higher hydrocarbons rich in olefins and diolefins. This cracked naphtha fraction, after intervening separation of cyclopentadiene and isoprene if desired, has been used as a feed for preparing high quality petroleum resins by polymerization in the presence of about 1% of aluminum chloride based on polymerization feed. The unpolymerized remainder is a useful gasoline component. One such typical process is described, for instance, in Patent 2,734,046. This steam cracking process served the art well as long as gasoline demand was sufficient to constitute the most economic outlet for light virgin naphtha streams and as long as there was a sufficient supply of the higher boiling fractions or the so-called middle distillates to be used economically as a feed for steam cracking.

More recently, however, especially in some regions, the demand for middle distillates, i.e., diesel and jet aircraft fuels as well as domestic and industrial fuels, has become quite high in relation to gasoline. As a result, situations have developed where the supply of light naphtha exceeds that needed for gasoline while all the middle distillates produced find an attractive market as fuels. In such situations it would be preferable to make ethylene, butadiene and the like by steam cracking light naphtha rather than the heavier distillates. However, when light naphtha is steam cracked, the resulting $C_5$-250° F. fraction is a very unsatisfactory feed for preparing the aforementioned petroleum resins. When derived from such cracked light naphtha, the resulting resins not only are obtained in very poor yields, but also tend to contain appreciable amounts of catalyst residue, show poor color stability, poor oxidation resistance as well as a relatively low softening point. This unfavorable combination of properties consequently precludes their being put to premium uses such as for paper sizing, etc.

It is the main object of the present invention to devise a process permitting the use of light naphtha as a steam cracking feed and simultaneously producing not only ethylene, butadiene, etc., but also a cracked $C_5$-plus fraction suitable as a polymerization feed in the preparation of high quality petroleum resins. Still another object is to improve the resin yields obtainable in the polymerization and to improve polymerization catalyst efficiency. These and other objects, as well as the nature, scope and operation of the invention will become more clearly apparent from the following description. In reading this description it should be understood that all ratios, proportions and percentages are expressed throughout on a weight basis, unless otherwise indicated.

It has been found that in making the petroleum resins about 0.5 to 2 percent of aluminum chloride catalyst (based on total hydrocarbon feed to the polymerization zone) is needed, more or less independently of the concentration of the polymerizable unsaturates present in the feed. Because of this, when polymerizing a $C_5$-plus fraction derived from steam cracking of ordinary light naphtha, the amount of catalyst required is necessarily large in relation to the amount of resin produced since such a fraction normally contains large amounts of unconverted saturated hydrocarbons in addition to the polymerizable cracking products. This relatively large ratio of catalyst to reactive components of the polymerizable naphtha fraction appears to be principally responsible for the unsatisfactory resin quality derived from steam cracked light naphtha. However, reduction of catalyst concentration below about 0.5% based on total polymerization feed has been found impractical under normal circumstances, because low yields of resin are obtained. In addition the resin softening point becomes so low that the resin is not useful.

It has now been discovered that the foregoing difficulties can be substantially eliminated and a high quality resin prepared even from steam cracked light virgin naphtha, provided that the boiling range of the light naphtha used as cracking feed has a definite relation to the boiling range of the steam cracked fraction used as polymerization feed. More particularly it has been found that a surprising improvement in resin production is obtained if the boiling range of the steam cracked fraction used as resin polymerization feed is such that it is essentially completely below the boiling range of the light virgin naphtha used as steam cracking weed. As a corollary, since the bulk of the reactive hydrocarbons useful in making the petroleum resins are in the $C_5$ range, it is essential for the purposes of the present invention to use as steam cracking feed a light virgin naphtha from which normally present $C_4$ and $C_5$ hydrocarbons, i.e., materials boiling below 120° F., have been excluded, and then prepare a polymerization feed by segregating from the steam cracked products a fraction boiling from about 60° F. approximately up to the initial boiling point of the virgin naphtha feed. Of course, it is possible to use as cracking feed light naphthas having an initial boiling point higher than 120° F., e.g. 160° or even 180° F., in which event it will be possible correspondingly to raise the end point of the cracked fraction used as polymerization feed. In brief, the steam cracking feeds suitable for purposes of the present invention are light naphthas boiling in the range from 120° to about 350° F., e.g. 120°-220° F. Another essential feature of the invention requires that the steam cracked products be fractionated to provide as polymerization feed a fraction ranging from $C_5$ hydrocarbons up to the initial boiling point of the cracking feed used, preferably boiling from 60° to 120° F., and containing about 20 to 50 weight percent, preferably 25 to 40 weight percent, of material polymerizable in the resin production step.

The chemical composition of the feed has some effect on the yield of butadiene obtainable by steam cracking. However, as far as the by-product resin formation is concerned, the source of the virgin naphtha feed is relatively immaterial and may be either a predominantly paraffinic or a predominantly naphthenic crude. For instance, Arabian as well as Venezuelan light naphthas are suitable. Thus, a useful steam cracking feed is a light virgin naphtha having the following typical characteristics:

TABLE I

*Analysis of cracking feed*

Boiling range, °F _____ 120–220
Gravity, °API _____ 72

*Composition, weight percent*

Butanes _____ 0
Isopentane _____ 0.5
n-Pentane _____ 2.0
Cyclopentane _____ 0.5
Branched hexanes _____ 14.0
n-Hexane _____ 21.0
Methylcyclopentane _____ 4.0
Benzene _____ 1.5
Dimethyl pentanes _____ 8.5
Cyclohexane _____ 4.0
Methyl hexanes _____ 10.0
3-ethyl pentane _____ 2.5
Dimethylcyclopentanes _____ 3.0
2,2,4-trimethylpentane _____ 0.5
n-Heptane _____ 21.5
Methylcyclohexane _____ 4.5
Toluene _____ 2.0

It can be seen that this naphtha is about 80% paraffinic, mostly hexanes and heptanes, about 15% naphthenic, and less than 5% aromatic, with less than 3% of $C_5$ and lower hydrocarbons. More broadly speaking, suitable cracking feeds shall contain not more than 5% of $C_5$ and lower hydrocarbons, 40 to 100% of $C_6$–$C_7$ paraffins, 0 to 60% of $C_6$–$C_7$ naphthenes, and 0 to 10% of $C_6$–$C_7$ aromatics.

In practicing the invention, a light virgin naphtha having an initial boiling point above the aforementioned critical minimum of 120° F. is steam cracked in an otherwise well known manner. That is, it is mixed with steam to give a mixture containing about 60 to 90 mole percent, preferably about 70 mole percent, of steam, and the mixture is then passed through one or more cracking coils at 1300° to 1500° F., e.g. at about 1400° F., and at a low pressure between about 6 to 25 p.s.i.g., e.g. 10 p.s.i.g. The hydrocarbon partial pressure is, of course, much less, e.g. 10 to 15 p.s.i.a., preferably about 12 p.s.i.a. An increase is hydrocaron partial pressure tends to reduce operating costs, but this advantage tends to be offset by a reduction in ethylene and butadiene yields. The mixture is allowed to stay at reaction temperature for a relatively short time, e.g. 0.1 to 0.5 seconds, in substantially the same manner as when steam cracking gas oils, and is such that it results in producing about 35 to 70 percent of $C_3$ and lighter hydrocarbons based on naphtha feed. In other words, the temperature and resilience time of the cracking step are desirably correlated to produce a cracking severity to $C_3$ and lighter of about 35 to 70 percent. Conversions above 50% to $C_3$ and lighter are preferred where a naphtha of good antiknock properties is wanted, since high conversions tend to result in cracked naphthas having a relatively high aromatics content; however, the yield of the naphtha cut is reduced by high conversion.

Typical cracking runs are summarized in Table II wherein Run 1 shows the product distribution when steam cracking a conventional Middle East light virgin naphtha containing $C_5$ and higher hydrocarbons while Run 2 shows the product distribution in a similar run wherein the $C_5$ hydrocarbon had been removed from the feed as required in this invention. The feed of Run 2 is that described in Table I above. Run 4 shows the steam cracking of a Canadian light virgin naphtha.

TABLE II

*Yields of products from steam cracking naphthas at 1400° F. and 12 p.s.i.a. HCPP*

| Run No. | 1 | 2 | 4 |
|---|---|---|---|
| Naphtha Feed | $C_5$–220° F. | $C_6$–220° F. | $C_6$–250° F. |
| Yields—Wt. percent on Feed: | | | |
| $C_3$ and Lighter | 45.0 | 45.0 | 45.0 |
| Total $C_4$'s | 11.1 | 11.1 | 12.4 |
| Isoprene | } 0.7 | 1.5 | 2.1 |
| Piperylene | | | |
| Total $C_5$'s | 13.0 | 6.4 | 6.6 |
| $C_5$–$C_6$ Cyclopentadienes | 0.9 | 1.2 | 1.3 |
| Benzene | 2.0 | 2.1 | 3.3 |
| Toluene | 2.5 | 2.9 | 4.1 |
| $C_8$ and Heavier | 43.9 | 43.9 | 40.6 |

Comparing Runs 1 and 2, it is seen that Run 2 produces about twice as much isoprene and piperylene than Run 1, while the total $C_5$ fraction (including amylenes and some cyclopentadiene) is only about half as large in Run 2 as in Run 1. Of course, in Run 2 all of the $C_5$ hydrocarbons represent cracking products whereas in Run 1 a large proportion of this fraction is unconverted feed.

As seen in Run 4, the Canadian naphtha gave a product somewhat richer in benzene and toluene than obtained in the other two cracking runs.

The steam cracked naphtha can be processed in various ways. For instance, the products may be fractionated into four principal fractions; namely, $C_3$ and lighter gases (e.g., ethylene, propylene, etc.), a $C_4$ cut, a $C_5$ to 125° F. cracked naphtha fraction, and a higher boiling naphtha fraction. In view of the low end point of the light naphtha feed used in this invention, the amount of steam cracked product boiling above about 250° F. is generally quite small and, unlike when gas oil is stream cracked, will not usually justify separate recovery.

The naphtha fraction containing the $C_5$ hydrocarbons is then preferably, though not necessarily, heat soaked in a known manner, e.g., at 220° F. for 5 hours, to dimerize cyclopentadienes, whereupon the relatively high boiling cyclic dimers can be separated from the more volatile naphtha by fractionation. The cyclopentadienes themselves represent valuable chemical raw materials while their presence in the resin polymerization feed is not wholly desirable from the viewpoint of color stability and oxidation resistance. However, they do tend to have a favorable effect on resin softening point. The cracked $C_5$-plus naphtha, having a boiling range of about 59° to 120° F. or higher, is finally treated with aluminum chloride to remove the more active olefins in the form of a resinous polymer. If desired, isoprene may also be recovered from this cracked naphtha prior to polymerization. By removing the more active olefins by polymerization the cracked naphtha is made satisfactory for use as motor fuel, while the resinous polymer itself constitutes a valuable by-product.

The polymerization is carried out at temperatures between —40° to +160° F., preferably at 75 to 110° F., using about 0.5 to 2%, preferably 1 to 1.5%, $AlCl_3$ catalyst based on cracked naphtha being treated. The catalyst may be used either as a finely divided solid, or as a solution in methyl or ethyl chloride, or as a hydrocarbon slurry, etc. For instance, the polymerization may be effected by adding 1% powdered $AlCl_3$ to the fraction to be polymerized and maintaining the mixture at 95° F. for two hours. The polymerization is usually carried out at atmospheric pressure, but at the higher temperatures it is desirable to increase the pressure sufficiently to keep the monomers in the liquid phase. Accordingly, when polymerizing at 160° F. a pressure of about 5 atmospheres is desirable. Upon completion of the reaction the catalyst is destroyed by adding water. This quench water is separated from the resin-containing hydrocarbon solution and the resin solution washed with a 10% aqueous solution of sodium carbonate. The resin raffinate or stabilized naphtha is next distilled from the resin solution to 430° F. at atmospheric pressure and the remaining fill material is finally removed by distilling to 518° F. at 3 mm. Hg. The desired hydrocarbon resin constitutes the bottoms from this final distillation. Any fraction of the cracked naphtha that was not treated with aluminum chloride may be cleaned up and made useful as a motor fuel by conventional clay treatment or the like.

The end point of the cracked $C_{5+}$ cut used for resin manufacture depends largely on the diolefins present therein. For optimum results it has been found that the polymerization feed should contain about 10 to 30%, preferably about 10 to 20%, of diolefins. Thus when the amount of $C_5$-$C_6$ diolefins formed in the steam cracking step is large and all such diolefins are left in the polymerizable fraction, it is advantageous to polymerize a naphtha cut having a correspondingly greater amount of non-reactive hydrocarbons. By contrast, if the total amount of diolefins formed in small, or if cyclopentadienes and isoprene are removed from the cracked $C_{5+}$ cut prior to polymerization, the polymerizable naphtha cut should have a correspondingly lower content of saturated hydrocarbons. The concentration of diolefins can be controlled within the desired limits by proper adjustment of the end boiling point of the naphtha cut to be used for resin manufacture. Too low unsaturates concentration leads to high catalyst consumption and poor resin color as well as relatively low softening point, whereas too high diolefin concentrations lead to other complications.

Referring to the steam cracked product of Run 2 above, the $C_5$ fraction freed of cyclopentadienes and boiling between 59° and 122° F. contained diolefins in a concentration of about 25%, equal to about 1.6% based on cracking feed. As shown in polymerization Run 2 of Table III below, this cut gave a high quality petroleum resin in the polymerization step, in a yield of 37% based on polymerization feed. The higher boiling cracked naphtha fraction (boiling range 122-248° F.) contained a higher total amount of unsaturates, 2.3% on cracking feed, but since this fraction was about six times more voluminous than the low boiling fraction, the concentration of the unsaturates in this cut was quite low, about 2% diolefins and 4.4% olefins. This cut, therefore, was not a satisfactory resin feed. However, suitable blends of the lower and higher boiling cuts could be used to make the resin, provided that the resulting blended $C_5$-plus cut contains at least 10% diolefins.

The importance of choosing a proper cut for the resin polymerization is shown in Table III.

fraction obtained in cracking Run 2 of Table II and contained less than 7% diolefins.

The feed in polymerization No. 3 was also derived from cracking Run 2 but was a closely cut $C_5$ fraction freed of cyclopentadienes and of materials boiling above 122° F.; it contained about 23% diolefins.

The feed in polymerization No. 4 was a $C_5$-$C_6$ fraction freed of cyclopentadienes and obtained in cracking Run 4 of Table II; it also contained well over 10% diolefins plus a substantial amount of aromatics.

Polymerization Run 1 shows the importance of selecting a properly cut light naphtha as a feed for steam cracking. Since in this case the cracking feed contained $C_5$ hydrocarbons, these then necessarily formed a substantial part of the eventual $C_5$-plus polymerization feed and resulted in very low resin yields as well as a product of very poor color.

A comparison of polymerization Runs No. 2 and 3 similarly illustrates the importance of the invention in terms of resin color as well as resin yield, the latter being also indicative of a much better catalyst efficiency. Resin 2, prepared from a polymerization feed which included large amounts of virgin material, was quite dark in color and its yield, based on polymerization feed, was quite low. By contrast, resin 3 was prepared from a polymerization feed that had an end point lower than the initial boiling point of the cracking feed and was therefore essentially free of virgin material. As a result, resin 3 has excellent color and was obtained in a very good yield, i.e., with an excellent utilization of catalyst. There are indications that the poor color of resin 2 is due to the large amount of catalyst used in relation to resinous product obtained and the ensuing difficulty of removing all the catalyst from the resin.

Polymerization Run 4 likewise shows that when virgin material is largely excluded from the polymerization feed, a good yield of excellent resin is obtained.

Having described the general nature, operation and advantages of the invention, its scope is particularly pointed out in the appended claims.

The claimed invention:

1. A process of preparing a resin-forming feed which comprises mixing 60 to 90 mole percent of steam and correspondingly 10 to 40 mole percent of a light virgin naphtha fraction having a boiling range between 120° and 330° F. and substantially free of lower boiling hydrocarbons, said fraction containing not more than 5 wt. percent of $C_5$ and lower hydrocarbons, 40 to 100 wt. percent of $C_6$-$C_7$ paraffins, 0 to 60 wt. percent of $C_6$-$C_7$ naphthenes and 0 to 10 wt. percent of $C_6$-$C_7$ aromatics, passing this mixture through a steam cracking zone at a temperature between 1200° and 1500° F. and a pressure of between about 6 to 25 p.s.i.g., converting 35 to 70 weight percent of said naphtha fraction to $C_3$ and lower hydrocarbons in said cracking zone, and fractionally distilling the product to segregate a polymerizable

TABLE III

*Preparation of resins*

| Polymerization Run No. | 1 | 2 | 3 | 4 |
|---|---|---|---|---|
| Feed to Polymerization: | | | | |
| Type of Cut | Total $C_{5+}$ | Total $C_{5+}$ | $C_5$ (ex CPD) | $C_5$-$C_6$ (ex CPD). |
| Boiling Range, ° F | 59-330 | 59-330 | 59-122 | 59-158. |
| Diolefin Content, Percent | <5 | <7 | 23.4 | >10. |
| Derived from Cracking Run No. | 1 | 2 | 2 | 4. |
| Resin Yield: | | | | |
| Percent on Feed to Polymerization | 6 | 8 | 37 | 30. |
| Percent on Feed to Cracking | 2.8 | 3.8 | 2.0 | 5.1. |
| Resin Properties: | | | | |
| Softening Point, ° C | 98 | 115 | 70 | 87. |
| Color | Dark Brown | Dark Brown | Pale Yellow | Pale Yellow. |

The feed in polymerization No. 1 was the total $C_{5+}$ fraction obtained in cracking Run 1 of Table II and contained less than 5% diolefins.

The feed in polymerization No. 2 was the total $C_{5+}$ fraction containing about 10 to 30 weight percent diolefins and boiling largely between 60° F. and 160° F.

2. A process for making a hydrocarbon resin which comprises mixing 60 to 90 mole percent of steam and correspondingly 10 to 40 mole percent of a light virgin naphtha fraction having a boiling range between 120° and 220° F. and substantially free of lower boiling hydrocarbons, said fraction containing not more than 5 wt. percent of $C_5$ and lower hydrocarbons, 40 to 100 wt. percent of $C_6$–$C_7$ paraffins, 0 to 60 wt. percent of $C_6$–$C_7$ naphthenes and 0 to 10 wt. percent of $C_6$–$C_7$ aromatics, passing this mixture through a steam cracking zone at a temperature between 1350° and 1500° F. and a pressure of between about 6 to 25 p.s.i.g., converting 35 to 70 weight percent of said naphtha fraction to $C_3$ and lower hydrocarbons in said cracking zone, heating and fractionally distilling the resulting steam cracked product to segregate a polymerizable fraction free of cyclopentadienes and containing about 10 to 20 weight percent of other diolefins and boiling between 60° and 160° F., mixing the segregated polymerizable fraction with 1 to 1.5 weight percent of aluminum chloride, maintaining the mixture in liquid phase at 75° to 110° F. until the unsaturates are polymerized to form a resin, washing out the aluminum chloride from the polymerized hydrocarbons, and distilling volatile hydrocarbons from the resin product.

3. A process according to claim 2 wherein the steam cracked polymerizable fraction is a $C_5$ fraction boiling between about 60° and 120° F.

4. A process of preparing a resin-forming feed which comprises mixing 60 to 90 mole percent of steam and correspondingly 10 to 40 mole percent of a light virgin naphtha fraction having a boiling range between 120° and 330° F. containing not more than 5 wt. percent of $C_5$ and lower hydrocarbons, 40 to 100 wt. percent of $C_6$ to $C_7$ paraffins, 0 to 60 wt. percent of $C_6$ to $C_7$ naphthenes, and 0 to 10 wt. percent of $C_6$ to $C_7$ aromatics, passing this mixture through a steam cracking zone at a temperature between 1200° and 1500° F. and a pressure of between about 6 to 25 p.s.i.g. and at a rate allowing a residence time in the range of about 0.1 to 0.5 seconds to convert 35 to 70 wt. percent of the naphtha feed to $C_3$ and lighter hydrocarbons, fractionally distilling the product to segregate a polymerizable $C_5$ and $C_{5+}$ fraction containing about 10 to 30 wt. percent diolefins and boiling in the range between about 60° F. and 160° F.

5. A process for making a hydrocarbon resin which comprises mixing 60 to 90 mole percent of steam and correspondingly 10 to 40 mole percent of a light virgin naphtha fraction having a boiling range between 120° and 330° F. containing not more than 5 wt. percent of $C_5$ and lower hydrocarbons, 40 to 100 wt. percent of $C_6$ to $C_7$ paraffins, 0 to 60 wt. percent of $C_6$–$C_7$ naphthenes, and 0 to 10 wt. percent of $C_6$ to $C_7$ aromatics, passing this mixture through a steam cracking zone at a temperature between 1350° and 1500° F. and a pressure of between about 6 to 25 p.s.i.g. and at a rate allowing a residence time of about 0.1 to 0.5 seconds to convert 35 to 70 wt. percent of the naphtha feed to $C_3$ and lighter hydrocarbons, heating and fractionally distilling the steam cracked product to segregate a polymerizable $C_5$ and $C_{5+}$ fraction free of cyclopentadienes and containing about 10 to 20 wt. percent of other diolefins and boiling in the range between about 60° and 160° F., mixing the segregated polymerizable fraction with 1 to 1.5 wt. percent of aluminum chloride, maintaining the mixture in liquid phase at 75° to 110° F. until the unsaturates are polymerized to form a resin, washing out the aluminum chloride from the polymerized hydrocarbons, and distilling volatile hydrocarbons from the resin product.

References Cited in the file of this patent

UNITED STATES PATENTS

| | | |
|---|---|---|
| 2,084,012 | Thomas | June 15, 1937 |
| 2,115,564 | Thomas et al. | Apr. 26, 1938 |
| 2,271,636 | Frolich | Feb. 3, 1942 |
| 2,709,695 | Wadsworth | May 31, 1955 |
| 2,728,742 | Banes et al. | Dec. 27, 1955 |
| 2,734,046 | Nelson et al. | Feb. 7, 1956 |
| 2,750,359 | Hammer et al. | June 12, 1956 |
| 2,779,750 | Fuqua et al. | Jan. 29, 1957 |